United States Patent
Barbeau et al.

(10) Patent No.: US 8,036,679 B1
(45) Date of Patent: Oct. 11, 2011

(54) OPTIMIZING PERFORMANCE OF LOCATION-AWARE APPLICATIONS USING STATE MACHINES

(75) Inventors: Sean J. Barbeau, Tampa, FL (US);
Philip L. Winters, Tampa, FL (US);
Rafael Perez, Temple Terrace, FL (US);
Miguel Labrador, Tampa, FL (US);
Nevine Georggi, Valrico, FL (US)

(73) Assignee: University of South Floirda, Tampa, FL (US)

( * ) Notice: Subject to any disclaimer, the term of this patent is extended or adjusted under 35 U.S.C. 154(b) by 553 days.

(21) Appl. No.: 12/245,072

(22) Filed: Oct. 3, 2008

Related U.S. Application Data

(60) Provisional application No. 60/977,140, filed on Oct. 3, 2007.

(51) Int. Cl.
*H04Q 7/20* (2006.01)

(52) U.S. Cl. ............... 455/456.1; 455/414.1; 455/456.3; 340/539.13

(58) Field of Classification Search ............... 455/456.1, 455/456.2, 456.3, 456.5, 456.6, 414.1, 403, 455/404.2, 67.11, 115.1, 115.3; 340/539.13
See application file for complete search history.

(56) References Cited

U.S. PATENT DOCUMENTS

| | | | |
|---|---|---|---|
| 6,873,258 B2 * | 3/2005 | Marples et al. ............ | 340/572.1 |
| 7,076,255 B2 * | 7/2006 | Parupudi et al. ........... | 455/456.1 |
| 7,224,979 B2 * | 5/2007 | Singhal et al. ............. | 455/456.1 |
| 2003/0158609 A1 | 8/2003 | Chiu | |
| 2005/0024277 A1 | 2/2005 | Hanshew et al. | |
| 2006/0240866 A1 | 10/2006 | Eilts | |
| 2007/0032225 A1 | 2/2007 | Konicek et al. | |
| 2009/0005061 A1 * | 1/2009 | Ward et al. ................. | 455/456.1 |
| 2010/0130228 A1 * | 5/2010 | Vendrow et al. ........... | 455/456.1 |

FOREIGN PATENT DOCUMENTS

| | | |
|---|---|---|
| EP | 1139206 A2 | 10/2001 |
| JP | 2003188793 A2 | 7/2003 |
| JP | 2004152839 A2 | 5/2004 |
| KR | 301574 A | 2/2003 |
| WO | 1999053472 A1 | 10/1999 |

OTHER PUBLICATIONS http://www.medien.ifi.lmu.de/pubdb/publications/pub/butz2004awareness/butz2004awareness.pdf.
http://www.sciencedaily.com/releases/2007/05/070521115913.htm.
Sean J. Barbeau, Miguel A. Labrador, Philip L. Winters, Rafael Perez, Nevine Labib Georggi. "A general architecture in support of interactive, multimedia, location-based mobile applications." Communications Magazine. IEEE. Nov. 2006. vol. 44. Issue. 11. pp. 156-163.
Diep Dao, Chris Rizos and Jinling Wang. "Location-based services: technical and business issues." GPS Solutions. vol. 6. No. 3. Dec. 2002. pp. 169-178.
Yilin Zhao. "Mobile phone location determination and its impact on intelligent transportation systems." Intelligent Transportation Systems. IEEE. vol. 1. Issue 1. Mar 2000. pp. 55-64.

\* cited by examiner

*Primary Examiner* — Cong Tran
(74) *Attorney, Agent, or Firm* — Courtney M. Dunn; Smith & Hopen, P.A.

(57) ABSTRACT

A location-aware method that dynamically adjusts software parameters in Location-Based Service (LBS) applications in real-time based on environmental conditions and application requirements. The invention saves power expended during position calculations while increasing application performance, optimizes settings for the application based on real-time conditions, and reduces bandwidth used. In an embodiment, the present method comprises a state machine or a plurality of state machines.

27 Claims, 11 Drawing Sheets

OPTIMIZING PERFORMANCE OF LOCATION-AWARE APPLICATIONS USING STATE MACHINES

CROSS REFERENCE TO RELATED APPLICATIONS

This application claims priority to currently co-pending U.S. Provisional Patent Application No. 60/977,140, entitled, "Location-Aware Applications using Parallel State Machines," filed Oct. 3, 2007.

STATEMENT OF GOVERNMENT INTEREST

This invention was made with Government support under Grant No. 2117770900 and FDOT Contract BD 549-WO #35 awarded by the Florida Department of Transportation. The Government has certain rights in the invention.

FIELD OF INVENTION

This invention relates to wireless communication devices and, in particular, minimizing the amount of location calculations attempted by a mobile device.

BACKGROUND

Advances in telecommunications and cell phone technology allow for the creation of many new types of applications. One class of applications, referred to as Location-Based Services (LBS), use the knowledge of the historical or real-time position of a mobile device to provide a service. Global Positioning System (GPS)-enabled cell phones are currently one of the more popular devices that provide LBS to end users.

These devices continuously become more advanced, featuring functionality that was state-of-the-art on desktop computers just a few years ago. Not only can these cell phones tell where a user is, but they can deliver on-demand text, sound, and video to the user. By combining the knowledge of the individual's physical location with these multimedia services, many different types of LBS can be realized. Some LBS include location-based messaging for emergency alerts such as traffic accidents or evacuation notices, location-based marketing of products or services to consumers, and real-time navigation instructions while driving or using public transportation.

The needs of LBS applications differ depending on the application domain and the purpose of the application. However, the minimization of costs, such as power consumption during the calculation and processing of location data, and network traffic to communicate location data to other locations, is always desired. Energy drains come from wireless communications, signal processing for wireless positioning methods, such as GPS, and the processor cycles needed to analyze and process location data at the application level. Existing LBS applications, assume fixed-position recalculation rates by the mobile device.

Positioning systems can utilize a number of different localizing technologies, including GPS, cellular network trilateration, or triangulation, RF-ID, Wi-Fi, Ultra-Wide Band (UWB), and hybrids of these and other technologies. In all of these systems, the position of the mobile device is calculated either on the device or on a centralized server. Hybrid systems can use assistance from the opposite party (i.e. a mobile device can calculate position information with assistance from the server, and the server can calculate position information with assistance from the mobile device). There is a cost associated with each position calculated on a server. Therefore, it is in the system's best interest to minimize the number of locations calculated either on the device or on a server.

A common problem found in LBS applications is the continuous querying of the positioning system when the system is temporarily unavailable, or when the user is immobile for extended periods of time. For example, if an application continues to request GPS fixes from a mobile phone when GPS signal levels are not sufficient to calculate the phone's location (e.g. the user is indoors), the phone will waste significant resources, such as battery energy and CPU cycles, before a timeout value is reached. Alternately, if a user is inside a building and a high-sensitivity GPS receiver is able to continuously calculate the user's location, significant battery energy is expended to repeatedly calculate the same general position.

Frequent locations recalculations will yield high accuracy, but at the cost of significant energy consumption. In contrast, infrequent position recalculations increase battery life, but are unable to accurately report real-time device location or the device's travel path while the user is traveling. Therefore, a method is needed that intelligently manages the rate of location calculation attempts to consume as little energy as possible based on real-time application-level needs.

SUMMARY OF INVENTION

Location-Based Services (LBS), or location-aware, applications are used to track users with a number of location technologies, including Global Positioning System (GPS), network trilateration, cell sector, and cell ID. However, these location technologies cause continuous calculation attempts on the mobile devices, which consume a considerable amount of energy. The present invention reduces the number of location calculation attempts.

The present invention includes a location-aware method, which manages the interval at which location information is requested by a mobile device while consuming a minimal amount of energy. In an embodiment of the present invention, the location-aware method increases the interval when the location information received by the mobile application is invalid and decreases the interval when the location information is valid. A maximum and minimum interval value may be set to prevent the interval from becoming too large or too small. In addition, the location-aware method may immediately return to its original internal value when the location information becomes available instead of incrementally decreasing.

In an embodiment of the present invention, the location-aware method adjusts a location recalculation interval in a location-aware application to regulate the amount of location calculations attempted by the location-aware application. The location-aware method comprises increasing the location recalculation interval when the a location calculation fails and the location recalculation interval is less than a first threshold value; decreasing the location recalculation interval when the location calculation is successful and the location recalculation interval is greater than a second threshold value; maintaining the location recalculation interval when the location calculation fails and the location recalculation interval is greater than or about equal to the first threshold value; and maintaining the location recalculation interval when the location calculation is successful and the location recalculation interval is less than or about equal to the second threshold value. The location recalculation interval may be set equal to an initial interval value. The second threshold value may equal the initial interval value.

In another embodiment of the present invention, the location-aware method comprises obtaining two location points; determining a movement distance by calculating the distance between the two location points; increasing the location recalculation interval when the movement distance is less than a distance threshold and the location recalculation interval is less than a first threshold value; decreasing the location recalculation interval when the movement distance is greater than the distance threshold and the location recalculation interval is greater than a second threshold value; maintaining the location recalculation interval when the movement distance is greater than the distance threshold and the location recalculation interval is less than or about equal to the second threshold value; and maintaining the location recalculation interval when the movement distance is less than the distance threshold and the location recalculation interval is greater than or about equal to the first threshold value. The location recalculation interval may be set equal to an initial interval value. The second threshold value may equal the initial interval value. The two location points may be the most recently calculated location points.

In another embodiment of the present invention, the location-aware method comprises obtaining a recent location point; obtaining a target location point; determining a target distance by calculating the distance between the recent location point and the target location point; decreasing the location recalculation interval when the target distance is less than a first distance threshold and greater than a second distance threshold, and the location recalculation interval is greater than a first interval threshold, wherein the second distance threshold is less than the first distance threshold; increasing the location recalculation interval when the target distance is greater than the first distance threshold and the location recalculation interval less than a second interval threshold; decreasing the location recalculation interval when the target distance is less than the first distance threshold and less than the second distance threshold, and the location recalculation interval is greater than the first interval threshold; increasing the location recalculation interval when the target distance is less than the first distance threshold and greater than second distance threshold, and the location recalculation interval is less than the second interval threshold; maintaining the location recalculation interval when a target distance is greater than the second predetermined distance threshold and the location recalculation interval is less than or about equal to the first threshold value; and maintaining the location recalculation interval when a movement distance is less than the predetermined distance threshold and the location recalculation interval is greater than or about equal to the second threshold value. The location recalculation interval may be set equal to an initial interval value. The second threshold value may equal the initial interval value. The recent location point may be the most recently calculated location point.

In another embodiment of the present invention, the location-aware method adjusts access to a plurality of available location technologies used by a location-aware application to regulate the amount of location calculations attempted by the location-aware application. The location-aware method comprises allowing the application access to a first location technology in the plurality of available location technologies and denying the application access to a second location technology in the plurality of available location technologies when the number of successful location calculations is greater than a minimum threshold number of successful location calculations, wherein the first location technology requires less of a wireless network's resources to perform location calculations; and allowing the application access to the second location technology and denying the application access to the first location technology when a location calculation fails.

In another embodiment of the present invention, the location-aware method adjusts a location recalculation interval and access to a plurality of available location technologies used by a location-aware application to regulate the amount of location calculations attempted by the location-aware application. The location-aware method comprises allowing the application access to a first location technology in the plurality of available location technologies and denying the application access to a second location technology in the plurality of available location technologies when the number of successful location calculations is greater than a minimum threshold number of successful location calculations, wherein the first location technology requires less of a wireless network's resources to perform location calculations; allowing the application access to the second location technology and denying the application access to the first location technology when the a location calculation fails; setting the location recalculation interval equal to a first interval value; increasing the location recalculation interval to a second interval value when a location calculation fails and the location recalculation interval is less than a first threshold value; decreasing the location recalculation interval to a third interval value when a location calculation is successful and the location recalculation interval is greater than a second threshold value; maintaining the location recalculation interval when a location calculation fails and the location recalculation interval is greater than or about equal to the first threshold value; maintaining the location recalculation interval when a location calculation succeeds and the location recalculation interval is less than or about equal to the second threshold value; increasing the interval values responsive to allowing access to the second location technology and the interval value is less than a third threshold value; and decreasing the interval values responsive to allowing access to the first location technology and the interval value is greater than a fourth threshold value. The second threshold value may equal the first interval value.

In another embodiment of the present invention, the location-aware method adjusts adjusting a location recalculation interval and a timeout value in a location-aware application to regulate the amount of location calculations attempted by the location-aware application. The location-aware method comprises increasing the location recalculation interval when a location calculation fails and the location recalculation interval is less than a first interval threshold value; decreasing the location recalculation interval when a location calculation succeeds and the location recalculation interval is greater than a second interval threshold value; maintaining the location recalculation interval when a location calculation fails and the location recalculation interval is greater than or about equal to the first interval threshold value; maintaining the location recalculation interval when a location calculation succeeds and the location recalculation interval is less than or about equal to the second interval threshold value; increasing the timeout value when a location calculation fails and the timeout value is less than a first timeout threshold value; decreasing the timeout value when a location calculation succeeds and the timeout value is greater than a second timeout threshold value; maintaining the timeout value when a location calculation fails and the timeout value is greater than or about equal to the first timeout threshold value; and maintaining the timeout value when a location calculation succeeds and the location recalculation interval is less than or about equal to the second timeout threshold value. The location recalculation interval may be set equal to an initial interval value. The second threshold value may equal the initial interval value. The recent location point may be the most recently calculated location point. The timeout value may be set equal to an initial timeout value.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1A:
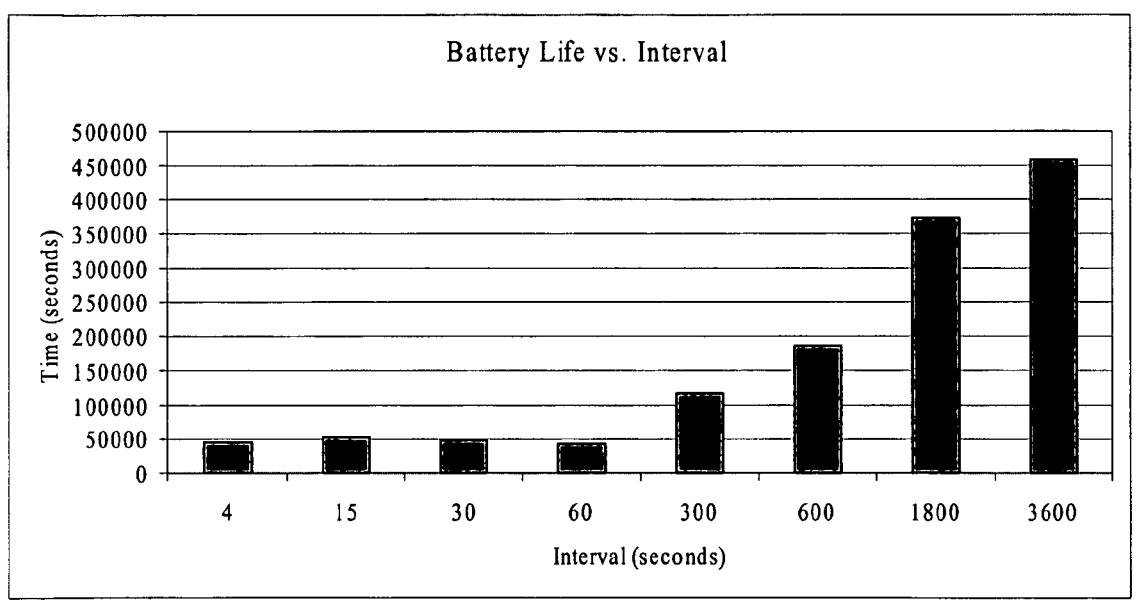
FIG. 1A is a graph comparing the battery life for a mobile device to varying location recalculation intervals in accordance with an embodiment of the present invention.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention includes a location-aware method. The location-aware method optimizes the number of locations calculated on a mobile device or server such that energy consumption and network traffic are minimized while the accuracy and reliability needs of the location-aware application are met.

On a mobile device, application variables can be manipulated in real-time in order to optimize application performance based on real-time conditions. Some manipulable application variables include the success or failure of the most recent location calculation attempt, the failure of a calculation attempt to meet a defined criterion (e.g. defined accuracy uncertainty threshold), the distance to a goal for a real-time navigation application, and the distance between the most recent location calculated. Many application properties also may be manipulated to optimize performance. Some examples include:

the update interval for the application (amount of time between location calculations),
  the type of location technology used to obtain the device's position,
  the timeout values used before a location request is considered to have failed,
  the location where the positioning calculations are performed (i.e. mobile device or server),
  sleep timers for the application,
  the amount of processing done at the application level,
  the maximum age of a past location calculation that can be returned to a new request,
  the allowance of cost to the application, and
  the accuracy requirements of the application.

Mobile devices utilize multiple types of positioning technology, including Global Positioning Systems (GPS), network trilateration, cell sector, cellular base station ID, and ultra wide band. The present method does not alter the type of location technology used by the device. Instead, the present method optimizes application states based on real-time conditions, such as the success or failure of the last location calculation attempt, the distance to the target location, and the distance between the last two calculated location points and the available location technology.

In an embodiment of the present invention, the location-aware method uses at least one state machine to minimize the amount of required location calculations for the mobile device, minimize the energy expended during application operation, and minimize the bandwidth used by reducing update intervals when possible while still meeting the performance needs of the application in its specific domain. The state machine(s) is(are) used to control the changes of state in an Location-Based Services (LBS), or location-aware, application based on various conditions, such as the success or failure of a location calculation attempt based on a given criteria (e.g. whether or not a location can be calculated, a defined accuracy uncertainty threshold), the distance between the two most recent calculated location points, and the distance between the current device location and a target location.

This functionality saves power by reducing polling intervals of location technology when high polling rates are not necessary (e.g. when inside a building where GPS signals are not available, when standing still for long periods of time, when located far from a target location, etc), but then increasing polling rates when desired for increased application performance (e.g. when exiting a building and GPS becomes available again, when movement increases, when a device nears its goal location, etc.).

Application performance can also be enhanced by adjusting multiple values in the state machine(s). For example, timeout values used to determine how long the device should try to calculate a position before the attempt is considered a failure should be adjusted along with the polling intervals. For instance, the timeout value can be maintained at half of the current polling interval. This means a five-second timeout value when twenty-second polling is used, a fifteen-second timeout when thirty-second polling is used, etc.

In an additional embodiment, the present method comprises a series of state machines. The use of multiple states machines is especially useful in devices utilizing multiple positioning technologies based on environmental conditions and application needs.

Implementation

The present invention was implemented in TRAC-IT, a Java Micro Edition (Java ME) application designed to automatically collect user travel behavior; the present method allows TRAC-IT to build an accurate representation of a user's path while consuming considerably less of the mobile device's battery life.

The location-aware method was evaluated by benchmarking battery life on a Sanyo SCP-7050 mobile phone with a Sanyo SCP-22LBPS 3.7V Lithium Ion 1000 milliampere-hour (mAh) battery on the Sprint-Nextel Code Division Multiple Access (CDMA) 1× Radio Transmission Technology (RTT) cellular network.

FIG. 1A shows the benefit of adjusting the GPS recalculation interval to values above sixty seconds. Battery life is extended from under fourteen hours using an interval of sixty seconds, to over thirty-three hours when using an interval of five minutes. While small intervals, such as four seconds, are required to accurately represent the user's path, as well as provide real-time services, significant savings can result from increasing the interval when the user is indoors, obstructed by tall buildings in a metropolitan area, or immobile for extended periods of time. Because the average daily travel time per person in the United States is only 82.3 minutes, utilizing this method results in significant savings over the entire day when compared to a static interval of four seconds required for real-time tracking, but is not useful when the user is indoors.

Figure 1B:
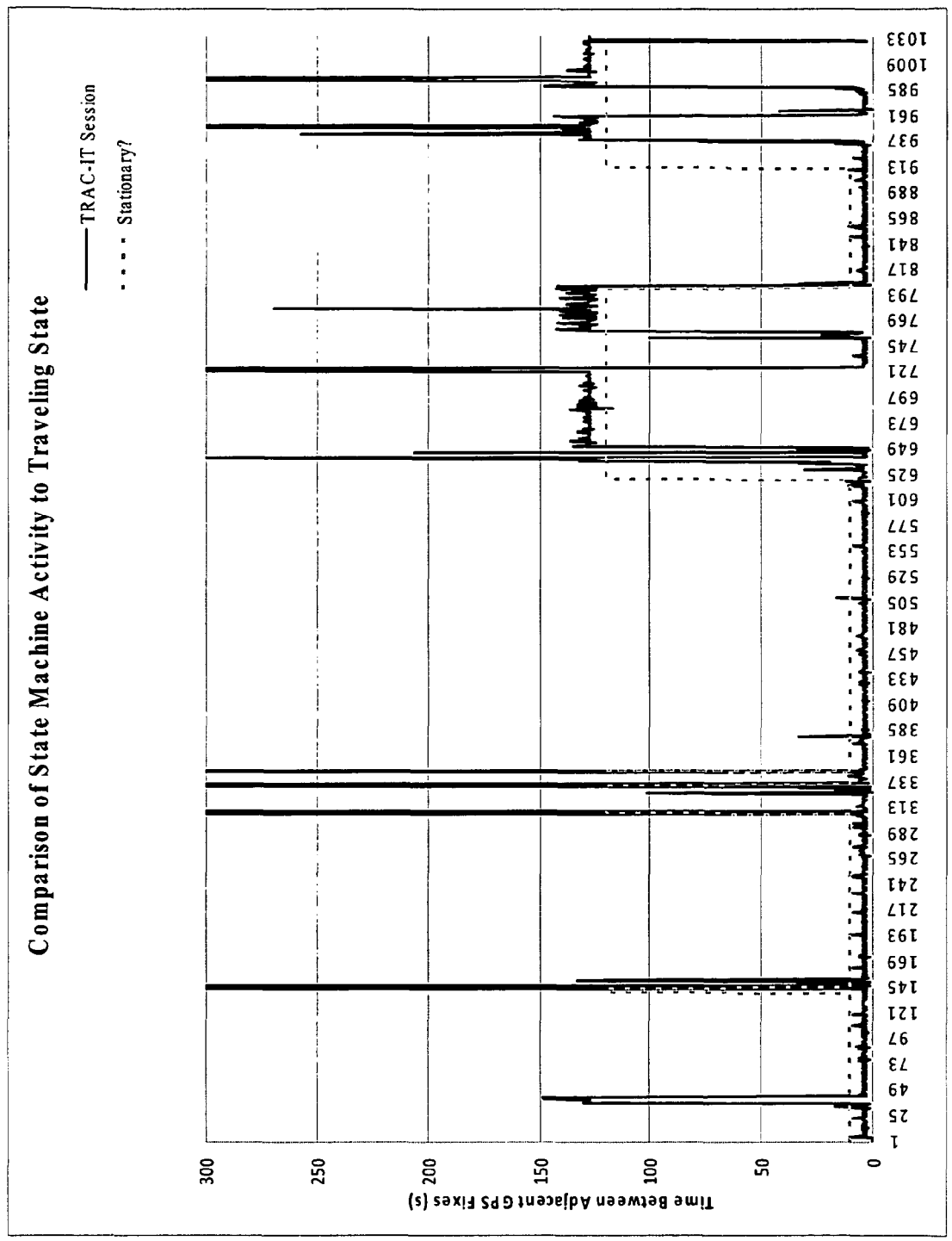
FIG. 1B is a graph showing the results of an implementation of the state machine on a mobile phone in accordance with an embodiment of the present invention.

FIG. 1B shows the results of an implementation of the state machine on a mobile phone. The solid line plotted on the graph shows the location recalculation interval starting at the first GPS for over one thousand GPS fixes as tracked by the TRAC-IT application having a state machine of the present invention implemented. The dotted line shows whether the state machine sees the mobile device as stationary for each of the GPS fixes.

Example 1

Generalized Single State Machine

Figure 2:
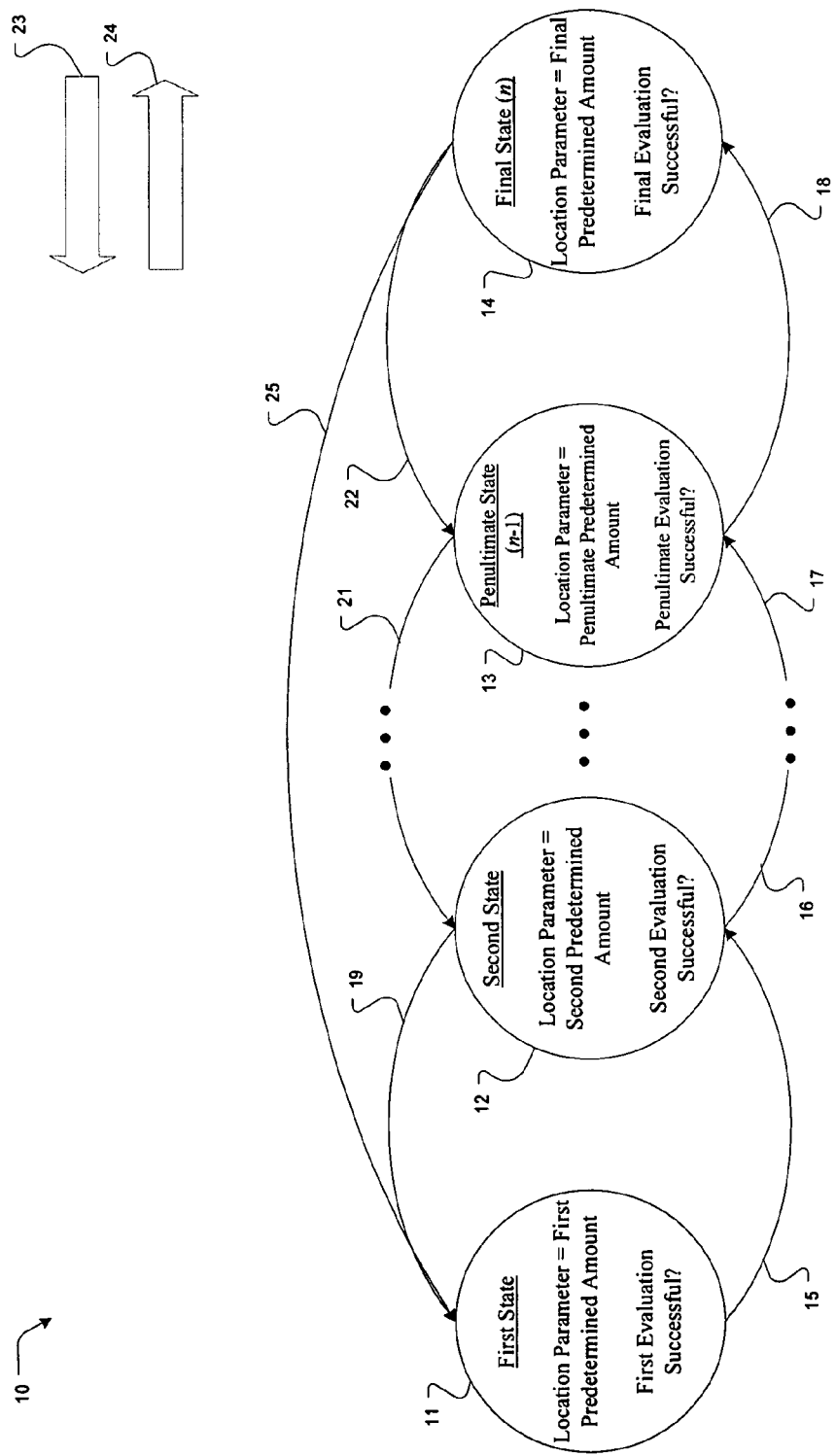
FIG. 2 is a generalized state machine diagram of the location-aware method shown with four illustrative states: first state, second state, penultimate state, and final state, in accordance with an embodiment of the present invention.

As shown in FIG. 2, the location-aware method is illustrated using state machine 10. State machine 10 comprises a plurality of states, or n states. FIG. 2 shows first state 11, second state 12, penultimate (n−1) state 13, and final (n) state 14. The location-aware method is called every time the calling LBS application successfully calculates a new location. The method then determines if state machine 10 should change states. Once the state changes, the location-aware method modifies various software and/or hardware settings based on the properties defined in the new state.

To illustrate, the method begins in first state 11, where a location parameter is set to a first predetermined amount. Next, the method evaluates whether state machine 10 should move to the next state, second state 12, or remain in first state 11. If the evaluation fails, then the method moves, in jump 15, to second state 12, and the location parameter is changed to a second predetermined amount. However, if the evaluation succeeds, then the method remains in first state 11 and the location parameter remains set to the first predetermined amount.

If the evaluation succeeds while the method is in second state 12, then the method moves back, in jump 19, to first state 11 and the location parameter is again set to the first predetermined amount. However, if the evaluation fails, the method moves forward, in jump 16, to the next state, where the location parameter is again changed. The method will continue moving states in forward direction 24 and changing the location parameter upon each failed evaluation. If enough evaluations fail, the method will reach penultimate state 13 after jump 17, where the location parameter will be set to a penultimate predetermined amount.

Once in penultimate state 13, if the evaluation succeeds, then the method moves back, in jump 21, to the previous state and the location parameter is changed to the previous state's predetermined threshold. The method continues moving back states in reverse direction 23 upon each successful evaluation until it reaches first state 11. However, if the evaluation fails, then the method moves forward, in jump 18, to final state 14, where the location parameter will be set to the final predetermined amount.

Once in final state 14, if an evaluation fails, the method remains in final state 14 and the location parameter remains set at the final predetermined amount. However, if an evaluation succeeds, the method moves, in jump 22, back to penultimate state 13, where the location parameter is again set to the penultimate amount. Alternatively, the method may also move, in jump 25, directly to first state 11, where the location parameter is set to the first predetermined amount. Allowing the method to move, in jump 25, from final state 14 to first state 11 provides the option of immediately obtaining location calculations instead of gradually moving from one state to another in reverse direction 23 until first state 11 is reached.

Example 2

Changing States Based on Success or Failure of Location Calculation Attempts Using a Single State Machine State changes may occur based on whether location calculation attempts succeed or fail. If a location calculation was not successful, the state is changed from a state X to a state X+1. Certain application properties, such as the time interval at which the location of the device is recalculated, can then be adjusted based on information contained in the new (X+1) state.

Figure 3:
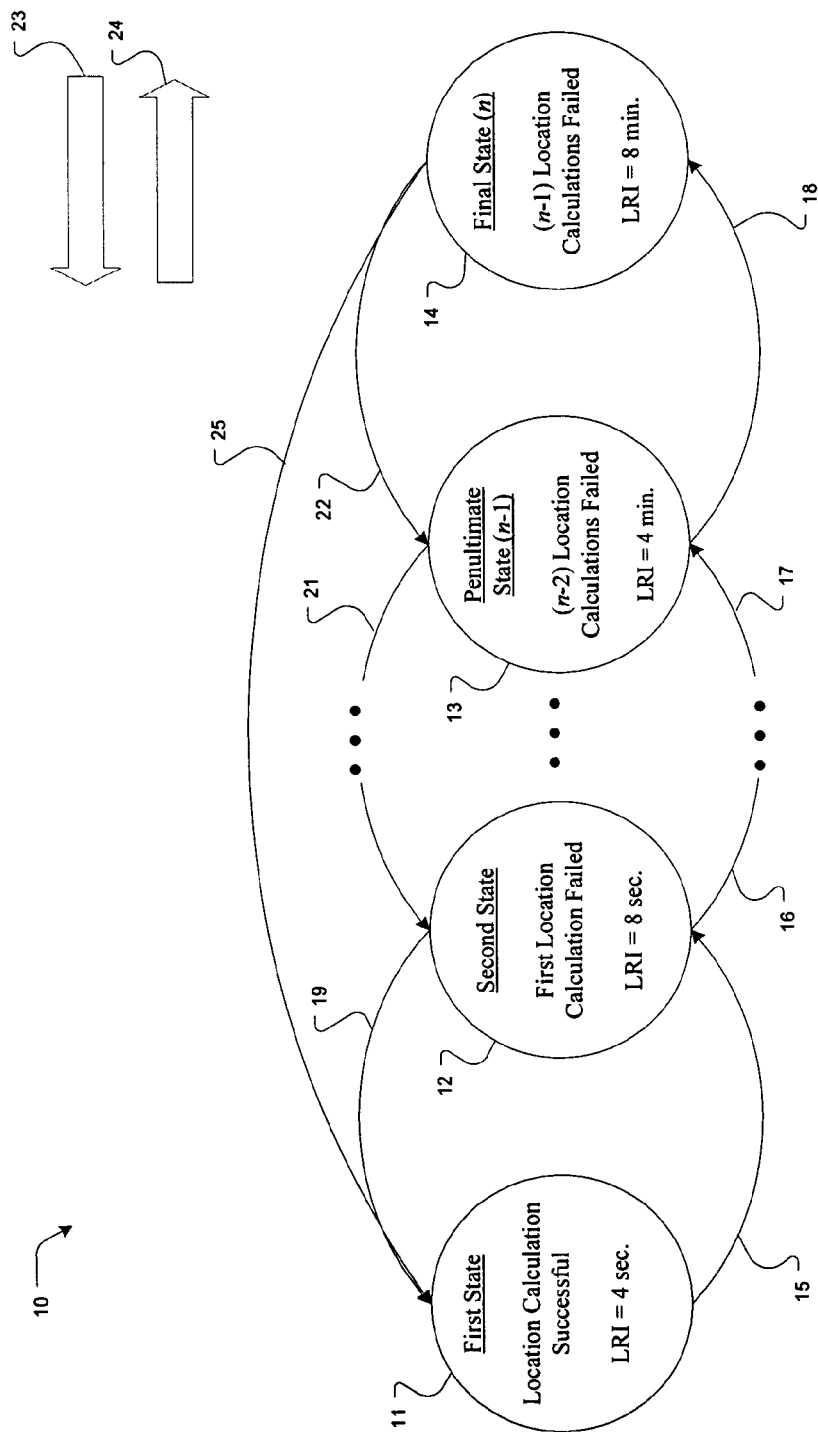
FIG. 3 is a state machine diagram of the location-aware method in which state changes are based on the success or failure of location calculation attempts in accordance with an embodiment of the present invention. Example location recalculation intervals are shown here between four seconds and eight minutes.

As illustrated in FIG. 3, the method begins in first state 11, where the location recalculation interval is set to a first predetermined amount, which is illustrated here as four seconds. If the next location calculation succeeds, then the method remains in first state 11 and the location recalculation interval remains set to the first predetermined amount (or four seconds). However, if the calculation fails, then the method moves, in jump 15, to second state 12, and the location recalculation interval is increased to a second predetermined amount, which is illustrated here as eight seconds.

If the calculation succeeds while the method is in second state 12, then the method moves back, in jump 19, to first state 11 and the location recalculation interval is decreased back to the first predetermined amount (or four seconds). However, if the calculation fails, then the method moves, in jump 16, to the next state, where the location recalculation interval is again changed. The method will continue moving states in forward direction 24 upon each failed location calculation. If enough location calculations fail, the method will reach penultimate state 13, after jump 17, where the location recalculation interval will be set to a penultimate predetermined amount, illustrated here as four minutes.

Once in penultimate state 13, if the location calculation succeeds, then the method moves back to the previous state, in jump 21, and the location recalculation interval is decreased to the previous predetermined threshold. The method continues moving back states, in reverse direction 23, upon each successful location calculation until it reaches first state 11, in which the location recalculation interval is again set to the first predetermined amount (or four seconds). However, if the location calculation fails, then the method moves forward to final state 14, in jump 18, where the location recalculation interval will be set to the final predetermined amount, which is illustrated here as eight minutes.

Once in final state 14, if a calculation fails, the method remains in final state 14 and the location recalculation interval remains set at the final predetermined amount. However, if a calculation succeeds, the method moves, in jump 22, back to penultimate state 13, where the location recalculation interval is then decreased to the penultimate amount. Alternatively, the method may also move, in jump 25, directly to first state 11, where the location recalculation amount is decreased back to the first predetermined amount (or four seconds).

In this manner, subsequent failures reduce the polling rate of the mobile device so power is not wasted on rapid attempts to obtain location calculations when one cannot be calculated. Failures may occur when the mobile device has been inside a building in which it cannot obtain a successful location calculation. While outdoors and in a location where successful location calculations are possible, the location recalculation interval will remain at four seconds in first state 11. Once the mobile device is inside, the location recalculation interval will increase. If the mobile device is inside the building for long enough, the location recalculation interval will reach eight minutes in final state 14 and will remain there as long as the mobile device remains in the building. But when the mobile device leaves the building and a successful location calculation is made, the location recalculation interval may move in jump 25 to first state 11, if it is desired to obtain location calculations as soon as possible or it may move gradually from final state 14 to first state 11, decreasing its interval from eight minutes, to four minutes and so on until an interval of four seconds is reached.

Example 3

Changing States Based on the Distance Between the Two Most Recent Calculated Location Points Using a Single State Machine State changes may also occur based on the distance between the two most recent points calculated. State machine 10 moves forward a state (from state X to state X+1) upon a failed distance evaluation. A distance evaluation fails when the distance between the two most recent calculated locations is less than a predetermined threshold (for example, one meter). Certain application properties, such as the time interval at which the location of the device is recalculated, can then be adjusted based on information contained in the new (X+1) state. State machine 10 moves back a state (from state X+1 to state X) upon a successful distance evaluation. A distance evaluation is successful when the distance between the two most recent calculated locations is greater than the predetermined threshold. Application properties can then be adjusted based on information contained in the new (X) state.

Figure 4:
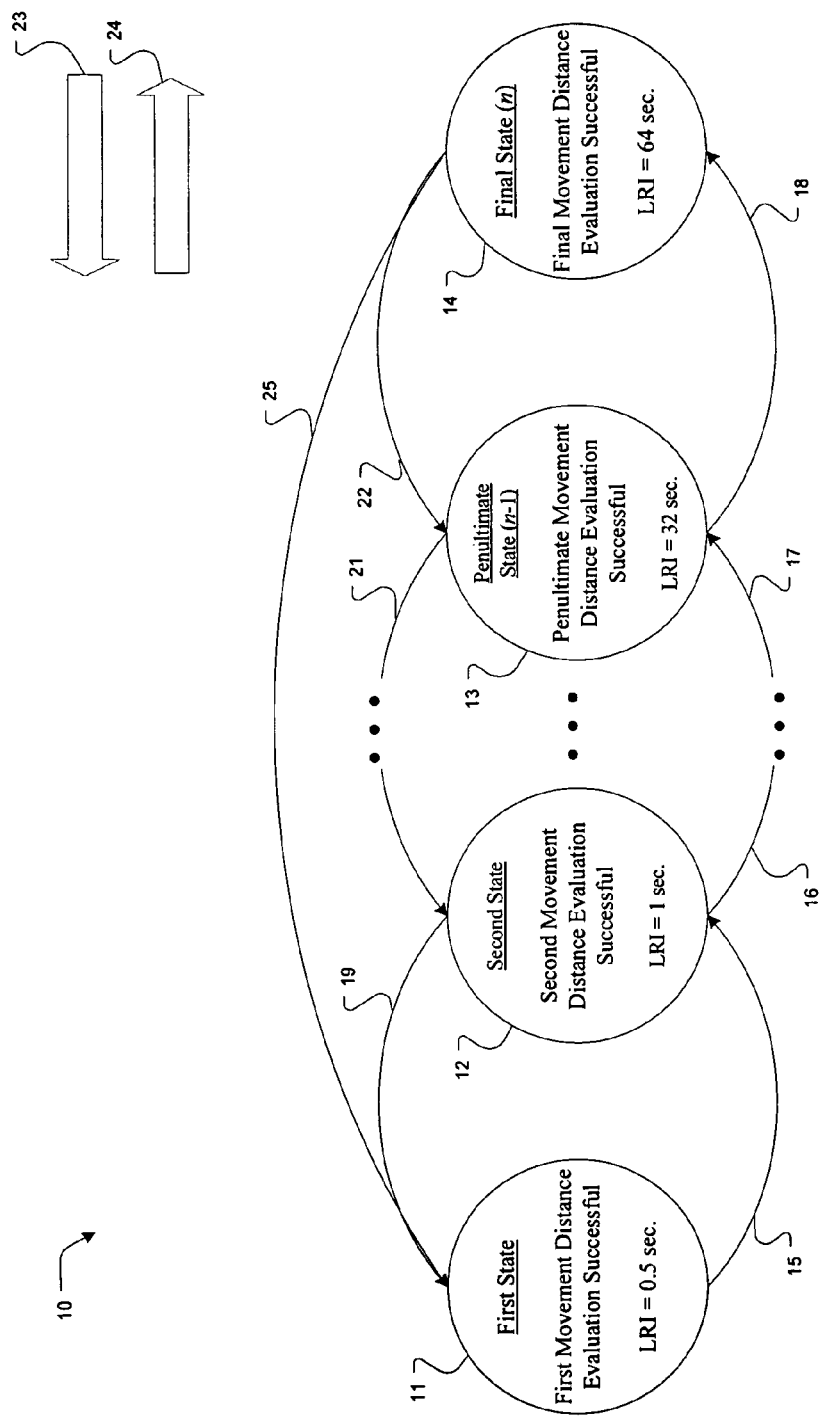
FIG. 4 is a state machine diagram of the location-aware method in which state changes are based on the distance between the two most recently calculated location points in accordance with an embodiment of the present invention. Example location recalculation intervals are shown here between 0.5 seconds and sixty-four seconds.

As illustrated in FIG. 4, the method begins in first state 11, where the location recalculation interval is set to a first predetermined amount, which is illustrated here as 0.5 seconds. If the distance evaluation succeeds (i.e. the distance between the last two calculated locations is greater than the predetermined threshold (e.g. one meter)), then the method remains in first state 11 and the location recalculation interval remains set to the first predetermined amount (or 0.5 seconds). However, if the distance evaluation fails (i.e. the distance between the last two calculated location is less than the predetermined threshold (e.g. one meter)), then the method moves, in jump 15, to second state 12, and the location recalculation interval is increased to a second predetermined amount, which is illustrated here as one second.

If the distance evaluation succeeds while the method is in second state 12, then the method moves back, in jump 19, to first state 11 and the location recalculation interval is decreased to the first predetermined amount (or 0.5 seconds). However, if the calculation fails, the method moves, in jump 16, to the next state, where the location recalculation interval is again increased. The method continues moving states, in forward direction 24, and increasing the location recalculation interval upon each failed distance evaluation. If enough distance evaluations fail, the method will reach penultimate state 13, after jump 17, where the location recalculation interval will be set to a penultimate predetermined amount, illustrated here as thirty-two seconds.

Once in penultimate state 13, if the distance evaluation succeeds, then the method moves back to the previous state, in jump 21, and the location recalculation interval is decreased the previous state's predetermined threshold. The method continues moving back states, in reverse direction 23, and decreasing the location recalculation interval upon each successful distance evaluation until it reaches first state 11, in which the location recalculation interval is again set to the first predetermined amount (or 0.5 seconds). However, if the distance evaluation fails, then the method moves forward, in jump 18, to final state 14, where the location recalculation interval will be set to the final predetermined amount, which is illustrated here as sixty-four seconds.

Once in final state 14, if the distance evaluation fails, the method remains in final state 14 and the location recalculation interval remains set at the final predetermined amount. However, if the distance evaluation succeeds, the method moves, in jump 22, back to penultimate state 13, where the location recalculation interval is then decreased back to the penultimate amount (or thirty-two seconds). Alternatively, the method may also move, in jump 25, directly to first state 11, where the location recalculation amount is decreased to the first predetermined amount (or 0.5 seconds).

In this manner, subsequent failures reduce the polling rate of the mobile device so that power is not wasted on rapid attempts to obtain location calculations when new calculations are not needed. Failures will occur when the mobile device is stationary, or at least relatively stationary, such as when the user is at work or home or even when the user is stuck in traffic or stopped at a red light. As illustrated in FIG. 4, while the mobile device's movement exceeds the distance threshold, the location recalculation interval will remain at 0.5 seconds in first state 11. Once the mobile device becomes (relatively) stationary, the location recalculation interval will increase. If the mobile device is (relatively) stationary for long enough, the location recalculation interval will reach sixty-four seconds in final state 14 and will remain there as long as the mobile device remains (relatively) stationary. But when the mobile device begins moving and its movement exceeds the distance threshold, the location recalculation interval may move in jump 25 to first state 11, if it is desired to obtain location calculations as soon as possible once movement begins or it may move gradually to first state 11, decreasing the interval from sixty-four seconds, to thirty-two seconds, and so on, until an interval of 0.5 seconds is reached.

The predetermined distance threshold may be adjusted for sensitivity to movement, depending on the needs of the application, mobile device and/or the user. The higher the distance threshold, the less sensitive the method will be to movement. Although a distance threshold that is set too high may reduce accuracy of the calling application, a threshold that is set properly may significantly reduce the number of location calculation attempts and thereby significantly reducing power consumption. Decreasing the distance threshold may make the method more sensitive to movement; however, a distance threshold that is set too low may negate the benefits of the method by never triggering a move from one state to another. Therefore, in the present method, the distance threshold may be adjusted such that it provides for a reduction in the number of location calculation attempts without significantly reducing the accuracy of the calling application or negating the benefits of the method.

Example 4

Changing States Based on the Distance Between the Mobile Device and the Target Location Using a Single State Machine State changes may occur based on the distance between the mobile device and a target location. This can be used in applications, such as a navigation application, to increase the number of location calculation attempts as the mobile device approaches a target location thereby increasing the application's accuracy and allowing a reduction in calculation attempts at less crucial times. An example of a target location in a navigation application would be the next planned turn in a user's route.

If the target distance, the distance between the current location and the target location, is greater than a predetermined threshold, then the method is in its original state (x). The method remains in its original state (x) as long as the target distance exceeds the predetermined threshold. As the mobile device approaches its target location, the state would move forward a state (from state x to state x+1) at certain distance thresholds in order to decrease the location recalculation interval as the mobile device approaches the target location. This will ensure that the mobile device will not miss its target location, because the location will be updated more frequently as the mobile device physically approaches the target location.

Additionally, the reverse application of the method applies as the mobile device moves away from the target location. As the device moves away, the location recalculation interval is increased as the mobile device exceeds the predetermined distance thresholds in reverse order.

Further, a state may transition directly to another state and avoid stepping through intermediate states when an immediate change to a lower interval (i.e. more frequent updates) is required. This is especially useful in real-time applications, which are usually time dependent.

Figure 5:
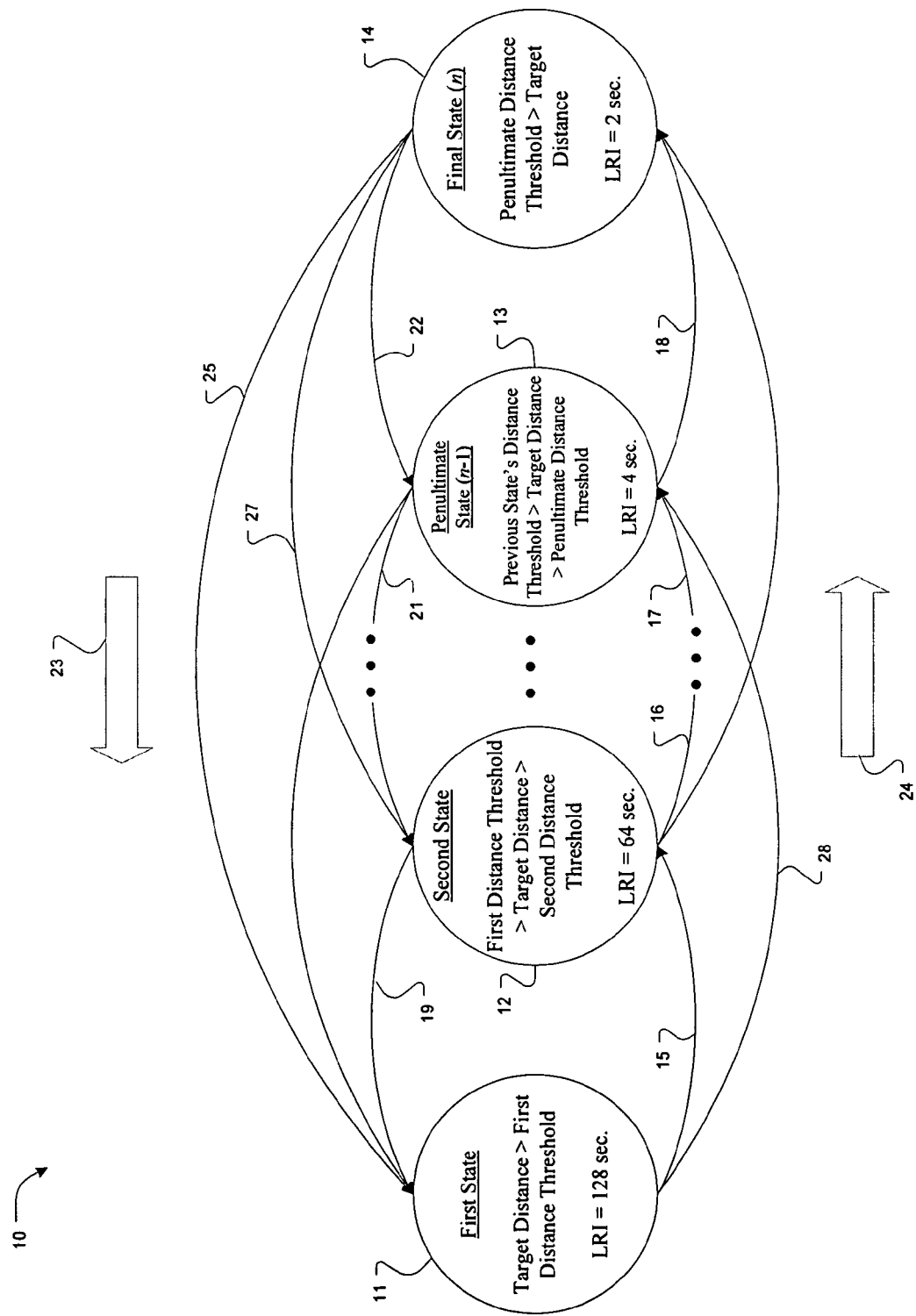
FIG. 5 is a state machine diagram of the location-aware method in which state changes are based on the distance between the mobile device and a target location in accordance with an embodiment of the present invention. Example location recalculation intervals are shown here between one twenty-eight seconds and two seconds.

An example is illustrated in FIG. 5. Movement between each state depends on the target distance. The target distance is compared to the distance thresholds of each state to determine the value of the location recalculation interval.

The method begins by calculating the target distance. If the target distance is greater than a first distance threshold (for example, 5 miles), then the method is in first state 11. In first state 11, the location recalculation interval is set to a first interval amount, which is illustrated here as one hundred twenty-eight seconds. The method remains in first state 11 and the location recalculation interval remains at the first interval amount as long as the target distance exceeds the first distance threshold.

When the target distance falls below the first distance threshold, the method moves, in jump 15, to second state 12. In second state 12, the location recalculation interval is set to a second interval amount, which is illustrated here as sixty-four seconds. The method remains in second state 12 and the location recalculation interval remains at the second interval amount as long as the target distance is between the first distance threshold and a second distance threshold. If the target distance rises above the first distance threshold, the method moves, in jump 19, back to first state 11. Alternatively, if the target distance remains below the first distance threshold and also falls below the second distance threshold, the method will move, in jump 16, to the next state where the location recalculation interval will be further reduced.

The method continues moving states in forward direction 24, decreasing the location recalculation interval, as the mobile device moves towards the target location. Eventually, the method enters, after jump 17, penultimate state 13 when the target distance is greater than the penultimate distance threshold but less than the distance threshold of the previous state. In penultimate state 13, the location recalculation interval is reduced to a penultimate interval amount, which is illustrated here as four seconds. The method remains in penultimate state 13 and the location recalculation interval remains at the penultimate interval amount as long as the target distance is between the penultimate distance threshold and the previous state's distance threshold. If the target distance rises above the previous state's distance threshold, the method moves back, in jump 21, to the previous state. However, if the target distance falls below the penultimate distance threshold, then the method moves, in jump 18, to final state 14.

In final state 14, the location recalculation interval is set to a final interval amount, which is illustrated here as two seconds. The method remains in final state 14 as long as the target distance is less than the penultimate distance threshold. If the target distance rises above the penultimate distance threshold, then the method moves back, in jump 22 to penultimate state 13. The method may continue moving states in reverse direction 23 and increase the location recalculation interval as the target distance exceeds each state's distance threshold Additionally, the method may skip intermediate states if immediate changes in location recalculation intervals are desired. For example, as illustrated in FIG. 5, if the mobile device is at a target distance greater than the first threshold but is approaching the target location very quickly, the method may move, in jump 28, directly to penultimate state 13, instead of stepping through second state 12 and any other intermediate states. In the reverse direction, the method may move, in jump 27, from final state 14 to second state 12 or the method may move, in jump 25, from final state 14 to first state 11.

Example 5

General Parallel State Machine

A plurality of state machines is used to further minimize the number of location calculations performed by a mobile device. At least one of the state machines in the plurality of state machines may function the same as state machine 10, as described in the examples above. The remaining states machines may either follow the movement of first state machine 10 or move independently. The remaining state machines may be used to update other values of importance, such as timeouts on the location request and the maximum allowed age of the location information to be returned.

Example 6

Dynamically Changing Location Technology Using Parallel State Machines

Multiple state machines can be used to dynamically change the type of location technologies used based on conditions such as the success or failure of location calculation attempts.

Figure 6:
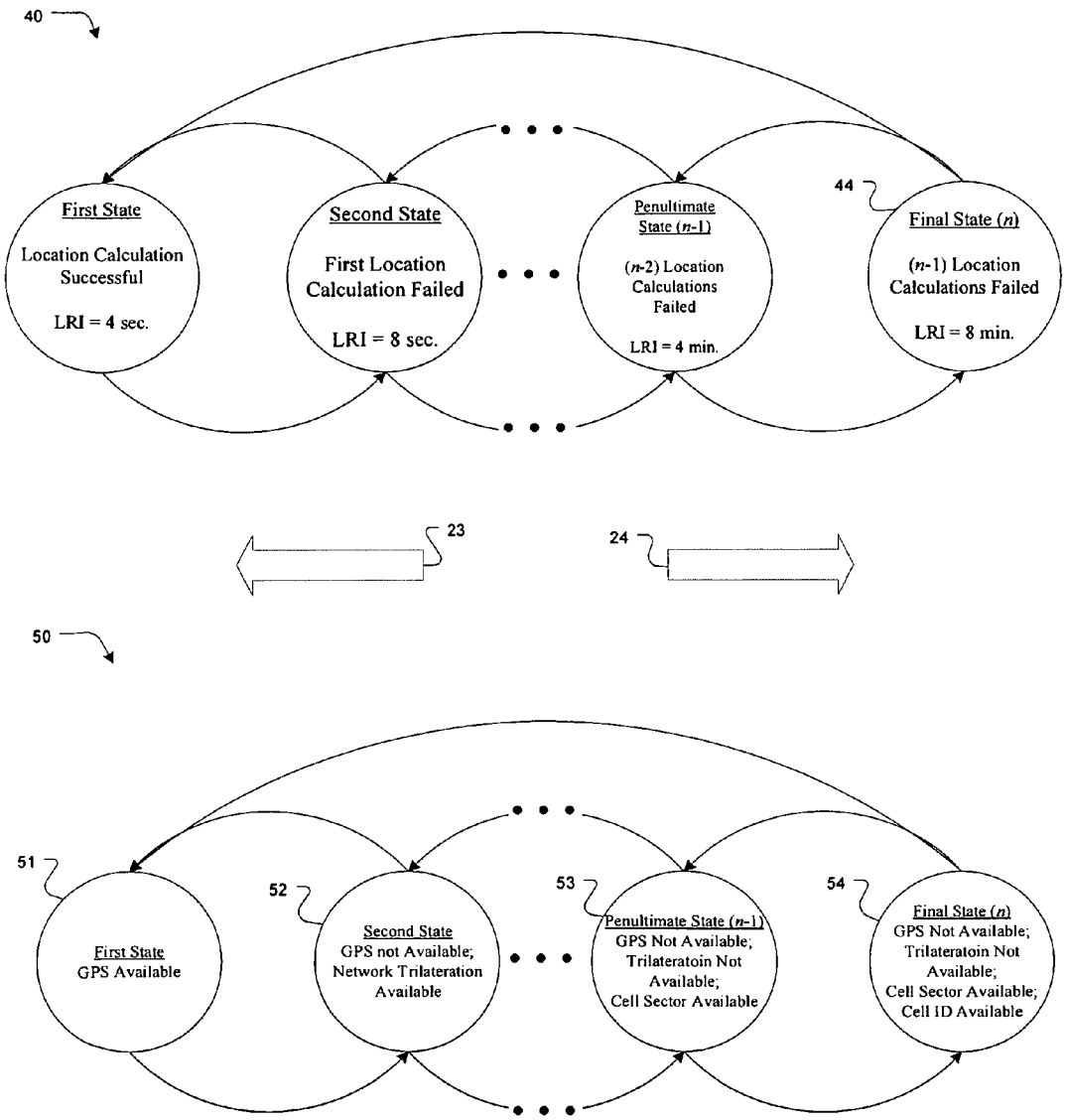
FIG. 6 is a parallel state machine diagram of the location-aware method in which state changes are used to dynamically change location technology in accordance with an embodiment of the present invention. Example location recalculation intervals are shown here between four seconds and eight minutes and example location technologies are shown here as global positioning system (GPS), network trilateration, cell sector, and cell ID.

As shown in the example illustrated in FIG. 6, parallel state machines (40 and 50) are used to choose among four types of location technologies: GPS, Network Trilateration, Cell Sector, and Cell ID, based on the success or failure of location calculation attempts. First state machine 40 changes states based on whether location calculation attempts succeed or fail, as described generally in Example 1 and, more specifically in Example 2. Each state in first state machine 40 changes the location recalculation interval. This is not meant to be limiting, as first state machine 40 may also change states based on other factors, such as the distance between the two most recent calculated location points as described in Example 3, and the distance between the mobile device and the target location, as described in Example 4.

Second state machine 50 also changes states based on the success or failure of location calculation attempts; however, each state in state machine 50 changes the location technology, as opposed to the location recalculation interval.

The location technology is set to GPS in first state 51. If GPS fails to produce a successful location calculation, then the method moves, in forward direction 24, to second state 52. In second state 52, network trilateration is used. If network trilateration fails to obtain a successful location calculation and GPS is still not available, the method moves to penultimate state 53, where cell sector is used. If cell sector fails to obtain a successful location calculation, the method moves to final state 54, where cell ID is used. Additional states may be added to second state machine 50 for other location technologies.

The moves from one state to another in second state machine 50 may be triggered when the method enters final state 44 of first state machine 40 or after a certain number of iterations of attempting to obtain a successful location calculation according to the location recalculation interval set in first state machine's 40 final state 44. The moves may also be triggered by an earlier state of first state machine 40 to more quickly obtain location calculations. State machine 50 may also move in reverse direction 23 once a number of successful location calculations have been attained with a more power-draining technology to determine if a technology that consumes less power is available.

Example 7

Dynamically Changing the Method of Obtaining the Location Recalculation Interval Using Parallel State Machines An application may dynamically choose to use or ignore one or more state machines to further optimize performance of the application.

Figure 7:
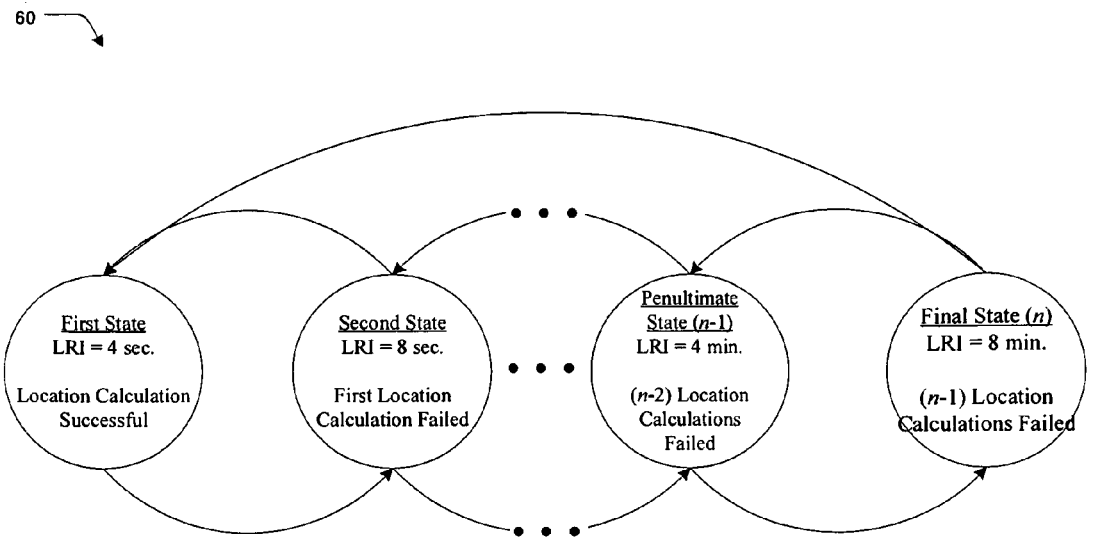
FIG. 7 is a parallel state machine diagram of the location-aware method in which state changes are used to dynamically change the method of obtaining location recalculation intervals in accordance with an embodiment of the present invention. Example location recalculation intervals are shown here between four seconds and eight minutes for the first state machine and between one-hundred twenty-eight seconds and two seconds for the second state machine.
Figure 7:
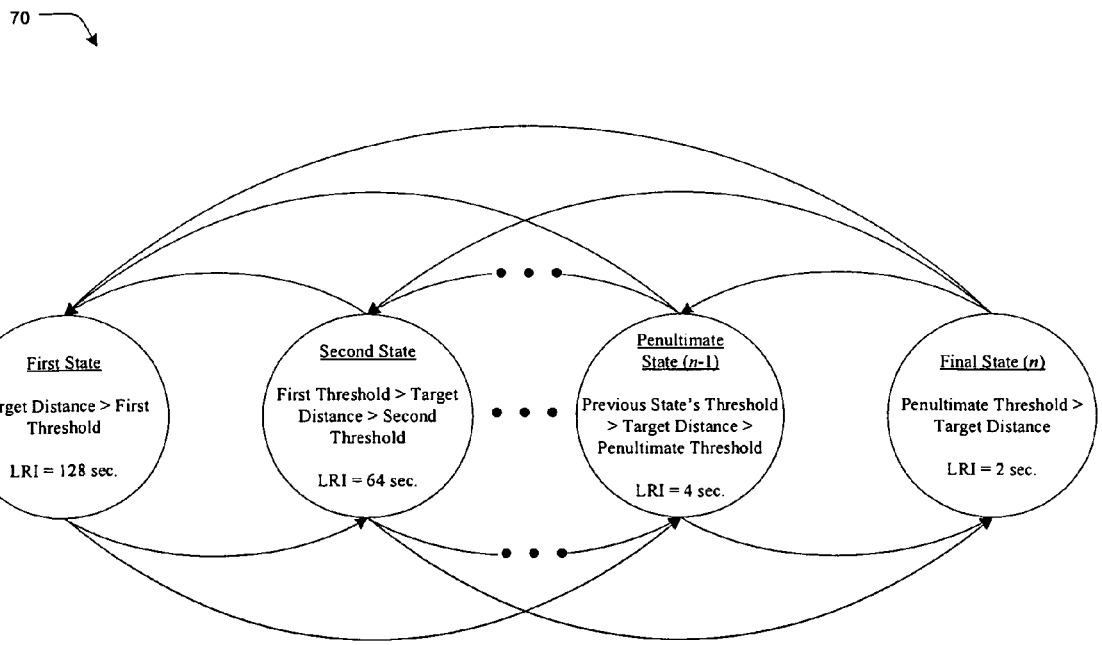

As illustrated in the example shown in FIG. 7, an application may have access to state machine 60, which changes states (and adjusts location recalculation interval) based on the success or failure of location calculation attempts (similar to the state machine presented in Example 2), and state machine 70, which changes states (and adjusts location recalculation interval) based on the distance between the current location and the target location, (similar to the state machine presented in Example 4).

While an application is performing real-time navigation, it uses state machine 70 and does not use state machine 60. When the real-time navigation is complete, the application then switches to state machine 60. Because state machine 70 has the potential to poll at a much faster rate than state machine 60, this setup allows the application to only use state machine 70 when it is needed the most and switch to a more conservative polling rate, available by using state machine 60, when such rapid polling is not necessary.

Example 8

Dynamically Changing the Location Technology Based on Wireless Carrier Restrictions Using Parallel State Machines An application may use state machines to dynamically change the type of location technologies used based on wireless carrier restrictions. This is useful when a wireless carrier restricts the frequency of the use of certain technologies, such as network trilateration because of the extra burden it places on the network for each calculation. In contrast, wireless carriers usually allow unrestricted use of GPS, because the primary burden for calculations is placed on the mobile device.

Figure 8:
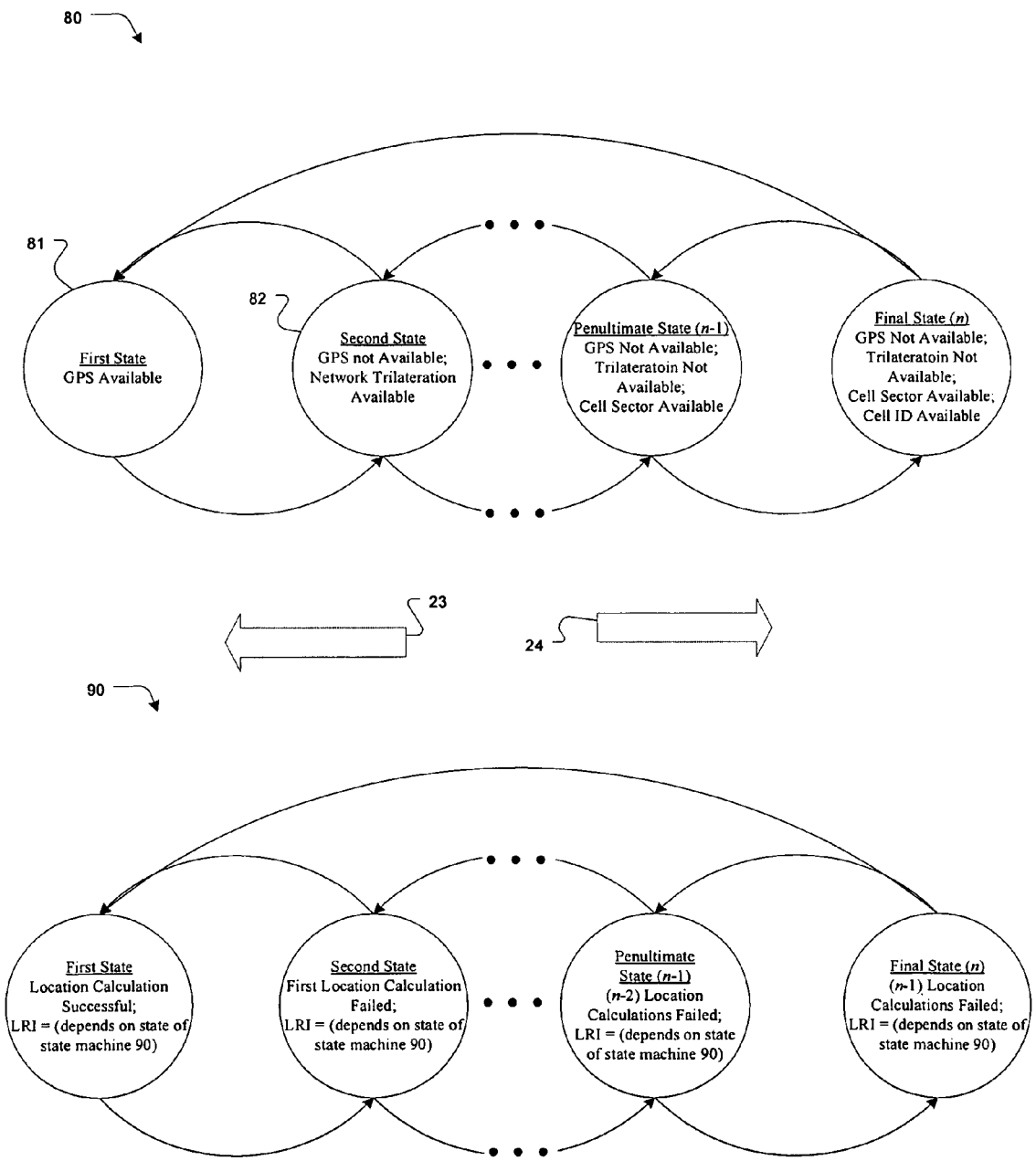
FIG. 8 is a parallel state machine diagram of the location-aware method in which state changes are used to dynamically change location technology based on wireless carrier restrictions in accordance with an embodiment of the present invention. Location technology is changed by the states of the first state machine and the amounts of the location recalculation intervals in the second state machine diagram depend on the location technology activated by the first state machine. Example location technologies are shown here as global positioning system (GPS), network trilateration, cell sector, and cell ID.

As illustrated in the example shown in FIG. 8, parallel state machines are used to dynamically alter the location recalculation interval according to the availability of location technology and the application's access to the location technology due to restraints presented by a wireless carrier's restrictions. Four types of location technologies, GPS, Network Trilateration, Cell Sector, and Cell ID, are illustrated here.

First state machine 80 changes states based on the availability of location technology according to the restraints presented by a given wireless carrier's restrictions. Second state machine 90 changes states based on whether location calculation attempts succeed or fail, as described generally in Example 1 and, more specifically in Example 2. Each state in second state machine 90 changes the location recalculation interval. However, the location recalculation intervals set by each state in second state machine 90 are changed each time first state machine 80 changes states. For example, when first state machine 80 is in first state 81, GPS is available and being used. Therefore, low location recalculation intervals (or a high polling frequency) are used in second state machine 90 when first state machine 80 is in first state 81. When first state machine 80 moves to its second state 82, because GPS is no longer available but network trilateration is available, higher location recalculation intervals (or a lower polling frequency) are needed. Therefore, when first state machine's 80 moves to its second state 82, higher location recalculation intervals are used in second state machine 90. As first state machine 80 changes states in forward direction 24, the location recalculation intervals in the states of second state machine 90 are increased.

Additional states may be added to first state machine 80 for other location technologies. First state machine 80 may also move in reverse direction 23 once a a location technology that consumes less power becomes available.

Alternatively, a plurality of parallel state machines may be used in place of second state machine 90, each of the plurality of state machine corresponding to a state from first state machine 80. Each of the plurality of state machine contains location recalculation intervals appropriate for the location technology of the corresponding state of first state machine 80. As first state machine 80 moves from one state to the next, the corresponding state machine in the plurality of state machines is enabled and the remaining state machines are disabled.

In this manner, the parallel state machine optimizes the number of location calculation attempts by providing location recalculation interval's that correspond to the location technology being used by the mobile device.

Example 9

Dynamically Changing Location Recalculation Intervals Based on Timeout Values Using Parallel State Machines Multiples state machines may be used to dynamically change location recalculation intervals based on timeout values, including the amount of time before a location request is considered a failure. Smaller interval times should use smaller timeout values, so the state machines move together based on the same condition evaluation, such as whether the location calculation attempt is successful or whether the location calculation meets a defined criterion, such as an accuracy uncertainty threshold.

Figure 9:
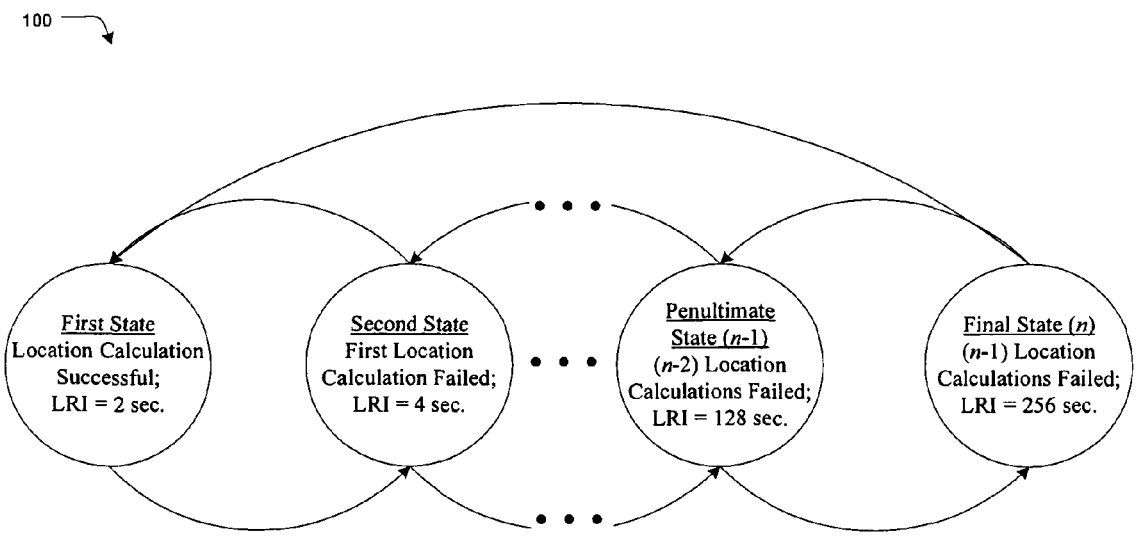
FIG. 9 is a parallel state machine diagram of the location-aware method in which state changes are used to dynamically change the location recalculation intervals based on timeout values in accordance with an embodiment of the present invention. Example location recalculation intervals are shown here between two seconds and two hundred fifty-six seconds for the first state machine and example timeout values are shown here between one second and one hundred twenty-eight seconds.
Figure 9:
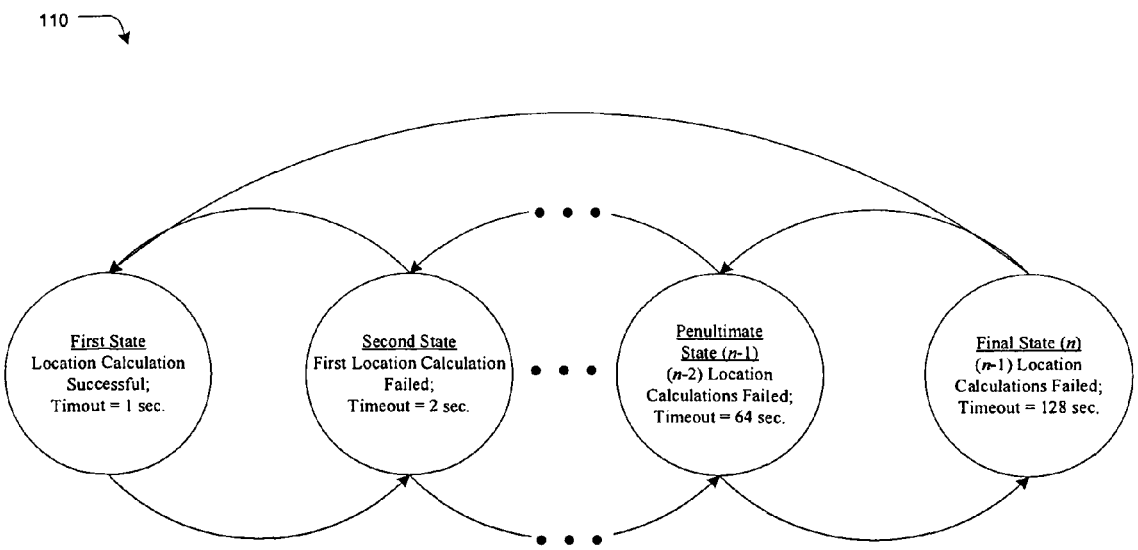

In the example shown in FIG. 9, the timeout is maintained as half the location recalculation interval. First state machine 100 changes the location recalculation interval as it changes states and second state machine 110 changes the timeout value, or the amount of time before a location calculation attempt is considered a failure. Both first state machine 100 and second state machine 110 change states based on the same condition evaluation, the success or failure of a location calculation attempt. Other condition evaluations may also be used, such as those provided in the earlier examples. In this manner, the number of location calculation attempts is reduced.

Example 10

Dynamically Changing Location Recalculation Intervals Using Advanced Logic

Advanced logic is used to trigger state transitions and thereby further optimize the manner in which location calculations are performed by a location-aware application. This example seeks to maximize the amount of location data collected while a mobile device is moving, and minimize the amount of location data calculated when the mobile device is not moving for extended amounts of time. The maximum amount of location data collected while a mobile device is moving may be capped by a fixed maximum rate, e.g. one fix every four seconds. The minimum amount of location data collected while a mobile device is not moving may also be restricted, but by a fixed minimum rate, e.g. one fix every one hundred twenty seconds.

Figure 10:
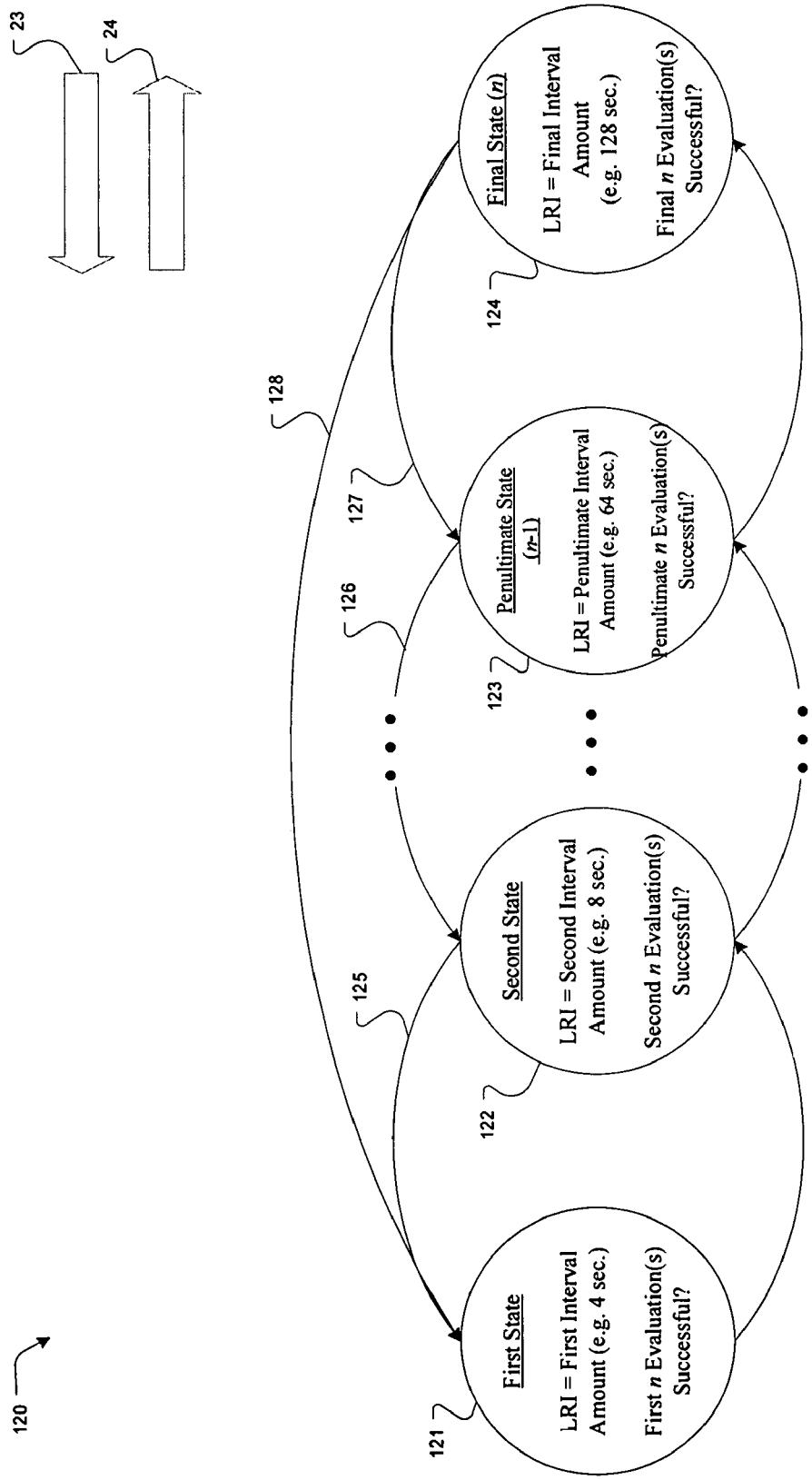
FIG. 10 is a parallel state machine diagram of the location-aware method in which state changes are used to dynamically change the location recalculation intervals based on advanced logic in accordance with an embodiment of the present invention. Example location recalculation intervals are shown here between four seconds and one hundred twenty-eight seconds.

As illustrated in the example shown in FIG. 10, each state represents a location recalculation interval: first state 121 has a location recalculation interval of four seconds, second state 122 has a location recalculation interval of eight seconds, third, penultimate state 123 has a location recalculation interval of sixty-four seconds, and final state 124 has a location recalculation interval of one hundred twenty-eight seconds.

When the location technology, such as GPS, is initially turned on (i.e. the tracking application is first started), it may take some time to acquire the mobile device's initial position. Even though the initial position calculations may fail, state machine 120 will not immediately transition to the next state. Instead, state machine 120 waits a predetermined amount of time (e.g. 60 seconds). If a position cannot be calculated in this predetermined amount of time, then state machine 120 begins normal state transitions.

Transitions may occur after every failed or successful location calculation attempt or the method may count the number of successive failures or successes and trigger transitions only after a certain number of failures occur. For example, once three successive location calculation attempts have failed state machine 120 will transition from first state 121 to second state 122. After another three successive location calculation attempts have failed, state machine 120 will transition from second state 122 to the next state in forward direction 24.

If a successful location calculation is attained, then state machine 120 begins detection to see if the mobile device is moving or if it is stopped. Repeated location calculation failures assume that the mobile device is stopped and in a location where location points cannot be calculated. If location calculations are continuously successful, state machine 120 monitors moving states using three primary attributes: device speed (obtained in each location calculation), distance traveled between the two most recent location points, and the estimated horizontal accuracy of the current location points. Horizontal accuracy represents a circular region around the calculated location point where the probability of the mobile device's actual location falling within the circle is at least 68%. Horizontal accuracy is estimated for each calculated location point based on things such as signal quality and the number of satellites in view.

If the moving device is moving at a speed above a low-speed threshold (e.g. one meter per second), then state machine 120 remains in first state 121 in order to continuously record the mobile device's travel at a high rate (e.g. one location calculation every four seconds). Once the speed drops below the low-speed threshold (e.g. one meter per second) or the horizontal accuracy rises above a certain threshold (e.g. sixty meters), then a back-off timer is started and begins to count down from a set time value (e.g. two minutes). If these two values exceed their thresholds, it may indicate that the user has stopped (e.g. at a stop light, resting on a bench outside, sitting in an outdoor location, etc.). However, because the person may begin moving again soon if the stop is temporary, the state machine will not immediately raise the location recalculation interval. If the mobile device is moving at a speed above the low-speed threshold before the back-off timer expires, then the timer is reset and state machine 120 remains in first state 121. However, if the back-off timer expires before another high-speed value is detected, then state machine 121 transitions to second state 122 and saves the location calculated when the timer expired.

State machine 120 will then transition in forward direction 24 if it appears that the mobile is in the same location. However, if the mobile device appears to be moving again, then state machine 120 will transition in reverse direction 23. If state machine 120 is unsure if the mobile device is actually moving, then it will transition gradually by moving from state to state, such taking jump 127, jump 126, and jump 125 to transition from final state 124 to first state 121. If state machine 120 is sure that the mobile device is moving, then it will transition directly to first state 121 in jump 128. Upon each subsequent location calculation, the calculated speed is checked to see if it exceeds a high-speed threshold (e.g. 1.5 meters per second). If so, then the mobile device is most likely traveling again and state machine 120 will immediately snap back to first state 121.

In addition, the method checks each calculated location point to determine if the distance between the current location point and the previously saved location point (from the back-off timer expiration) exceeds a distance threshold (e.g. one hundred meters). If so, then the mobile device may have moved at a low speed from the place where it initially stopped and the method may need to begin transitions in reverse direction 23. Because the distance between two location points could exceed the distance threshold due to location technology accuracy, there is uncertainty as to whether the mobile device is actually moving, so state machine 120 will not immediately snap back to first state 121. Therefore, if the distance threshold is exceeded but the mobile device's speed remains under the high-speed threshold, state machine 120 transitions by one state towards first state 121. If the distance threshold is not exceeded and the high-speed threshold is not exceeded (or if the location technology is not available), then the method assumes the user is stopped and state machine 120 transitions in forward direction 24 towards final state 124 upon each subsequent location calculation attempt that also does not meet this criteria.

If location calculation failures occur at any point, the method assumes the same logic as used on failures of the first-fix attempt: either transition in forward direction 24 after every failed location calculation attempt, or counting the number of failures and only transitioning after a certain number of failures have occurred in a row.

Other technologies such as embedded accelerometers may be used as a wakeup trigger, which could potentially eliminate the requirement of occasional location calculation being used to determine if the use has started moving yet.

Example 11

Example Implementation Demonstrated with Pseudo-Code

Pseudo code based on an implementation of an embodiment of the location-aware method is given below. This example uses GPS as the location technology. First initial threshold values are described along with example values. These threshold values can be changed and may be unique for different GPS hardware. And different GPS-enabled mobile phone models based on factors such as the quality of GPS hardware and environmental conditions. Then a description of the state transitions is given in pseudo code, followed by a description of the back-off timer.

Initial Threshold Values:
  A low-speed threshold is used to determine whether the back-off timer should be started—e.g. LOW_SPEED_THRESHOLD=1.
  A high-speed threshold used to determine if tracking should be resumed immediately—e.g. HIGH_SPEED_THRESHOLD=1.5.
  A horizontal estimated accuracy uncertainty threshold is used to determine whether or not the GPS recalculation rate should be changed—e.g. HOR_ACC_THRESHOLD=60
  A counter is used to add up the number of invalid location objects returned before a state transition is triggered—e.g. INVALID_LOCATION_COUNT=0.
  A threshold number of consecutive invalid locations is used to triggers the state machine to back off—e.g. INVALID_LOCATION_COUNT_THRESHOLD=10.
  A boolean variable is used to keep track of whether this execution of the LocationListener has received a GPS first fix yet. This is used since normally a first fix is desired to obtain a rough location measurement even if the mobile device is indoors—e.g. gotFirstFix=false.
  A boolean variable is used to detect whether or not this is the first execution of the state machine—e.g. firstExecution=true.
  A Variable is used to keep track of the first time the state machine was triggered. This is used in combination with the gotFirstFix flag to try to get a first fix for a period of time, but then back off after a certain amount of time has elapsed—e.g. startTime.
  A threshold time is used to stop trying to get first fix and start normal state machine operation if this time period expires, in milliseconds—e.g. FIRST_FIX_TIMEOUT=60000 (time in milliseconds (default=60 seconds)).

Logic to transition between states:
A new GPS fix is calculated and contained in variable "this.location" and is passed to the function described below.
//First, check to see if first fix has been obtained, because it is desired to keep the GPS chip hot (i.e. not use state machine) until a first fix is obtained (until a certain timeout value)
  if (gotFirstFix==true||((this.location.getTimestamp( )-startTime)>FIRST_FIX_TIMEOUT)){
    //First fix has been obtained or the timer to obtain first fix expired. If any condition holds where we want to start the backoff timer during normal state machine execution, then record that time.

```
if (this.location.isValid( )){
    if ((this.location.getSpeed( )<LOW_SPEED_
        THRESHOLD)||(this.location.getQualifiedCo-
        ordinates( ).getHorizontalAccuracy( )>
        HOR_ACC_THRESHOLD)||(this.location.get-
        LocationMethod( )==Location.MTE_CEL-
        LID)){
        //If the timer hasn't already been set, set the
            backoff timer
        if (!this.backOffTimer.isActive( )){
        this.backOffTimer.setActive(true);
        this.backOffTimer.setStartLocation(this.loca-
            tion);}}
        else{//If the current location seems like real
            travel data, reset the backoff timer
        if (this.location.getSpeed( )>LOW_SPEED_
            THRESHOLD){this.backOffTimer.setActive
            (false);}}}
    if (this.location.isValid( )&&(this.location-
        .getSpeed( )>HIGH_SPEED_THRESHOLD)){
        System.out.println("SM-High speed threshold
            exceeded . . . ");
        //If the user is moving at a high rate of speed,
            snap to the fastest GPS recalculation rate
        this.snapToZeroState( )
        this.backOffTimer.setActive(false); //Deactive
            backoff timer}else{
        //Check whether to move forwards or backwards
            by one state, or remain at current state
        if (this.location.isValid( )){INVALID_LOCA-
            TION_COUNT=0; //Reset invalid location
            counter
        if (this.backOffTimer.isTimerExpired(this.loca-
            tion)){System.out.println("SM-backoff timer
            expired . . . ");
        //**Location did NOT meet criteria, so change
            states to a "worse" value**
        this.moveAwayFromZeroState( );}else{
        //**Location met criteria, so change states to a
            "better" value**
        this.moveTowardsZeroState( );}}else{//Loca-
            tion was NOT valid INVALID_LOCATION_
            COUNT++; //Increment invalid location counter
        //If there have been a certain number of invalid
            locations in a row>threshold value, then back off
        if
            (INVALID_LOCATION_COUNT>INVALID_
            LOCATION_COUNT_THRESHOLD){Syste-
            m.out.println("SM-# invalid fixes passed thresh-
            old . . . ");
        //**Location did NOT meet criteria, so change
            states to a "worse" value**
        this.moveAwayFromZeroState( );}}}}
//Timestamp if this is the first iteration to start timer in case
    first fix takes long time to get, since the state machine
    should be started in order to reduce power usage if first
    fix isn't possible
if (firstExecution==true){firstExecution=false; //Mark
    that the first execution has occurred
    System.out.println("SM-1st execution, marking timer
        for first fix TO . . . ");
    startTime=this.location.getTimestamp( );}//timestamp
        beginning of state machine execution
//If this GPS fix was valid and a valid fix hasn't yet been
    recorded, set variable that indicates a valid fix was
    obtained.
if(gotFirstFix==false && this.location.isValid( ) && (this-
    .location.getLocationMethod( )!=Location.MTE_CEL-
    LID)){gotFirstFix=true;
    System.out.println("SM-Got first valid fix");
    }}else{System.out.println("SM-Location variable is
        null");}
BackupOff Timer:
//Class used to implement a backOff timer for the state
    machine private class BackOffTimer{
    //Start time & location for detecting whether to back off
        the GPS recalculation rate. Triggered based on GPS
        data properties such as whether or not the startLoca-
        tion is valid, the speed, and hor. accuracy of startLo-
        cation data. Location startLocation; //Location data,
        including date and time, that was obtained to start the
        backoff timer private boolean active=false; //Set to
        initially inactive
    //Threshold used to expire the timer based on the amount
        of time elapsed since the start time, in milliseconds
        BACKOFF_TIMER_THRESHOLD=120000; //2
        minute default time
//Threshold used to determine if the user has moved a
    significant amount of distance since the timer started, in
    meters. DISTANCE_THRESHOLD=100; //100 meters
    default distance
    public synchronized void setActive(boolean value)
        {this.active=value;}
    public synchronized long getStartTime( ){return this.start-
        Location.getTimestamp( );}
    public synchronized void setStartLocation(Location loca-
        tion){this.startLocation=location;}
/*
*Returns true if the time elapsed since the timer was started
    has surpassed
*the threshold and the user has not moved a significant
    distance, false if it has not
*/
public synchronized boolean is TimerExpired(Location
    currentLocation){if (this.isActive( )){
    try{
        //If the elapsed time is greater than the threshold, then
            timer might be expired (need to check other criteria
            based on type of positioning technology
        if (((currentLocation.getTimestamp( )-this.getStart-
            Time( ))>BACKOFF_TIMER_THRESHOLD)){
            //If neither locations are CellIDs and user hasn't
                moved a significant distance, then return true
            if((currentLocation.getLocationMethod( )!=Loca-
                tion.MTE_CELLID) && (startLocation.getLo-
                cationMethod( )!=Location.MTE_
                CELLID) && (startLocation.getQualifiedCo-
                ordinates( ).distance(currentLocation.getQuali-
                fiedCoordinates( ))<DISTANCE_THRESH-
                OLD)){
                return true;
            }else{
                //If the last fix was a CellID, then return true
                if(currentLocation.getLocationMethod( )==Loca-
                    tion.MTE_CELLID){
                    return true;}}
                }else{
                return false;}
        return false; //return false by default
    }catch (Exception e){
```

```
System.out.println("Exception in SM.backoff
    Timer( ):"+e);
    return false; //return false by default in case of excep-
        tion}
}else{
    //Timer is not active, so return false
    return false;}}}
```

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall there between. Now that the invention has been described,

What is claimed is:

1. A method of adjusting a location recalculation interval in a location-aware application, the method comprising:
   obtaining a location recalculation interval;
   increasing the value of the location recalculation interval responsive to a failed location calculation and the value of the location recalculation interval less than a first threshold value;
   decreasing the value of the location recalculation interval responsive to a successful location calculation and the value of the location recalculation interval greater than a second threshold value;
   maintaining the value of the location recalculation interval responsive to a failed location calculation and the value of the location recalculation interval greater than the first threshold value;
   maintaining the value of the location recalculation interval responsive to a failed location calculation and the value of the location recalculation interval about equal to the first threshold value;
   maintaining the value of the location recalculation interval responsive to a successful location calculation and the value of the location recalculation interval less than the second threshold value; and
   maintaining the value of the location recalculation interval responsive to a successful location calculation and the value of the location recalculation interval about equal to the second threshold value.

2. The method of claim 1, further comprising setting the value of the location recalculation interval equal to an initial interval value.

3. The method of claim 2, wherein the second threshold value equals the initial interval value.

4. A method of adjusting a location recalculation interval in a location-aware application, the method comprising:
   obtaining two location points;
   obtaining a location recalculation interval;
   determining a movement distance by calculating the distance between the two location points;
   increasing the value of the location recalculation interval responsive to the movement distance less than a distance threshold and the value of the location recalculation interval less than a first threshold value;
   decreasing the value of the location recalculation interval responsive to the movement distance greater than the distance threshold and the value of the location recalculation interval greater than a second threshold value;
   maintaining the value of the location recalculation interval responsive to the movement distance greater than the distance threshold and the value of the location recalculation interval less than the second threshold value;
   maintaining the value of the location recalculation interval responsive to the movement distance greater than the distance threshold and the value of the location recalculation interval about equal to the second threshold value;
   maintaining the value of the location recalculation interval responsive to the movement distance less than the distance threshold and the value of the location recalculation interval greater than the first threshold value; and
   maintaining the value of the location recalculation interval responsive to the movement distance less than the distance threshold and the value of the location recalculation interval about equal to the first threshold value.

5. The method of claim 4, further comprising setting the value of the location recalculation interval equal to an initial interval value.

6. The method of claim 5, wherein the second threshold value equals the initial interval value.

7. The method of claim 4, wherein the two location points are the most recently calculated location points.

8. A method of adjusting a location recalculation interval in a location-aware application, the method comprising:
   obtaining a recent location point;
   obtaining a target location point;
   obtaining a location recalculation interval;
   determining a target distance by calculating the distance between the recent location point and the target location point;
   decreasing the value of the location recalculation interval responsive to the target distance less than a first distance threshold and greater than a second distance threshold, and the value of the location recalculation interval greater than a first interval threshold, wherein the second distance threshold is less than the first distance threshold;
   increasing the value of the location recalculation interval responsive to the target distance greater than the first distance threshold and the value of the location recalculation interval less than a second interval threshold;
   decreasing the value of the location recalculation interval responsive to the target distance less than the first distance threshold and less than the second distance threshold, and the value of the location recalculation interval greater than the first interval threshold;
   increasing the value of the location recalculation interval responsive to the target distance less than the first distance threshold and greater than second distance threshold, and the value of the location recalculation interval less than the second interval threshold;
   maintaining the value of the location recalculation interval responsive to a target distance greater than the second predetermined distance threshold and the value of the location recalculation interval less than the first threshold value;
   maintaining the value of the location recalculation interval responsive to a target distance greater than the second predetermined distance threshold and the value of the location recalculation interval about equal to the first threshold value;
   maintaining the value of the location recalculation interval responsive to a movement distance less than the predetermined distance threshold and the value of the location recalculation interval greater than the second threshold value; and maintaining the value of the location recalculation interval responsive to a movement distance less than the predetermined distance threshold and the value of the location recalculation interval about equal to the second threshold value.

9. The method of claim 8, further comprising setting the value of the location recalculation interval equal to an initial interval value.

10. The method of claim 8, wherein the recent location point is the most recently calculated location point.

11. The method of claim 9, wherein the second threshold value equals the initial interval value.

12. A method of adjusting access to a plurality of available location technologies used by a location-aware application, the method comprising:
- allowing the application access to a first location technology in the plurality of available location technologies and denying the application access to a second location technology in the plurality of available location technologies responsive to the number of successful location calculations greater than a minimum threshold number of successful location calculations, wherein the first location technology requires less of a wireless network's resources to perform location calculations; and
- allowing the application access to the second location technology and denying the application access to the first location technology responsive to the failure of a location calculation.

13. A method of adjusting a location recalculation interval and access to a plurality of available location technologies used by a location-aware application, the method comprising:
- allowing the application access to a first location technology in the plurality of available location technologies and denying the application access to a second location technology in the plurality of available location technologies responsive to the number of successful location calculations greater than a minimum threshold number of successful location calculations, wherein the first location technology requires less of a wireless network's resources to perform location calculations;
- allowing the application access to the second location technology and denying the application access to the first location technology responsive to the failure of a location calculation;
- setting a value for a location recalculation interval equal to a first interval value;
- increasing the value of the location recalculation interval to a second interval value responsive to a failed location calculation and the value of the location recalculation interval less than a first threshold value;
- decreasing the value of the location recalculation interval to a third interval value responsive to a successful location calculation and the value of the location recalculation interval greater than a second threshold value;
- maintaining the value of the location recalculation interval responsive to a failed location calculation and the location recalculation interval greater than the first threshold value;
- maintaining the value of the location recalculation interval responsive to a failed location calculation and the location recalculation interval about equal to the first threshold value;
- maintaining the value of the location recalculation interval responsive to a successful location calculation and the location recalculation interval less than the second threshold value;
- maintaining the value of the location recalculation interval responsive to a successful location calculation and the location recalculation interval about equal to the second threshold value;
- increasing the value of the interval values responsive to allowing access to the second location technology and the value of the interval value less than a third threshold value; and
- decreasing the value of the interval values responsive to allowing access to the first location technology and the value of the interval value greater than a fourth threshold value.

14. The method of claim 13, wherein the second threshold value equals the first interval value.

15. A method of adjusting a location recalculation interval and a timeout value in a location-aware application, the method comprising:
- obtaining a location recalculation interval;
- increasing the value of the location recalculation interval responsive to a failed location calculation and the value of the location recalculation interval less than a first interval threshold value;
- decreasing the value of the location recalculation interval responsive to a successful location calculation and the value of the location recalculation interval greater than a second interval threshold value;
- maintaining the value of the location recalculation interval responsive to a failed location calculation and the value of the location recalculation interval greater than the first interval threshold value;
- maintaining the value of the location recalculation interval responsive to a failed location calculation and the value of the location recalculation interval about equal to the first interval threshold value;
- maintaining the value of the location recalculation interval responsive to a successful location calculation and the value of the location recalculation interval less than the second interval threshold value;
- maintaining the value of the location recalculation interval responsive to a successful location calculation and the value of the location recalculation interval about equal to the second interval threshold value;
- increasing the timeout value responsive to the failed location calculation and the timeout value less than a first timeout threshold value;
- decreasing the timeout value responsive to the successful location calculation and the timeout value greater than a second timeout threshold value;
- maintaining the timeout value responsive to a failed location calculation and the timeout value greater than the first timeout threshold value;
- maintaining the timeout value responsive to a failed location calculation and the timeout value about equal to the first timeout threshold value;
- maintaining the timeout value responsive to a successful location calculation and the value of the location recalculation interval less than the second timeout threshold value; and
- maintaining the timeout value responsive to a successful location calculation and the value of the location recalculation interval about equal to the second timeout threshold value.

16. The method of claim 15, further comprising setting the value of the location recalculation interval equal to an initial interval value.

17. The method of claim 15, further comprising setting the timeout value equal to an initial timeout value.

18. The method of claim 16, wherein the second interval threshold value equals the initial interval value.

19. A method of adjusting a location recalculation interval in a location-aware application, the method comprising:
obtaining a location recalculation interval;
increasing the value of the location recalculation interval responsive to a predetermined number of failed location calculations and the value of the location recalculation interval less than a first threshold value;
decreasing the value of the location recalculation interval responsive to a predetermined number of successful location calculations and the value of the location recalculation interval greater than a second threshold value;
maintaining the value of the location recalculation interval responsive to the predetermined number of failed location calculations and the value of the location recalculation interval greater than the first threshold value;
maintaining the value of the location recalculation interval responsive to the predetermined number of failed location calculations and the value of the location recalculation interval about equal to the first threshold value;
maintaining the value of the location recalculation interval responsive to the predetermined number of successful location calculations and the value of the location recalculation interval less than the second threshold value; and
maintaining the value of the location recalculation interval responsive to the predetermined number of successful location calculations and the value of the location recalculation interval about equal to the second threshold value.

20. The method of claim 19, wherein the predetermined number of failed location calculations equals the predetermined number of successful location calculations.

21. The method of claim 19, further comprising setting the value of the location recalculation interval equal to an initial interval value.

22. The method of claim 20, wherein the second threshold value equals the initial interval value.

23. The method of claim 19, further comprising waiting a predetermined amount of time before increasing the value of the location recalculation interval responsive to the predetermined number of failed location calculations and the value of the location recalculation interval less than the first threshold value.

24. The method of claim 19, further comprising:
obtaining a speed of travel;
maintaining the value of the location recalculation interval responsive to the speed of travel greater than a low-speed threshold, and the value of the location recalculation interval less than the second threshold value;
maintaining the value of the location recalculation interval responsive to the speed of travel greater than the low-speed threshold, and the value of the location recalculation interval about equal to the second threshold value;
maintaining the value of the location recalculation interval responsive to the speed of travel less than the low-speed threshold for less than a predetermined amount of time, and the value of the location recalculation interval less than the second threshold value;
maintaining the value of the location recalculation interval responsive to the speed of travel less than the low-speed threshold for less than the predetermined amount of time, and the value of the location recalculation interval about equal to the second threshold value; and
increasing the value of the location recalculation interval responsive to the speed of travel less than the low-speed threshold for greater than the predetermined amount of time, the predetermined number of failed location calculations, and the value of the location recalculation interval less than the first threshold value.

25. The method of claim 19, further comprising:
decreasing the value of the location recalculation interval to about the value of the second threshold value responsive to the speed of travel greater than a high-speed threshold, the predetermined number of successful location calculations, and the value of the location recalculation interval greater than the first threshold value.

26. The method of claim 19, further comprising:
obtaining two location points;
determining a movement distance by calculating the distance between the two location points; and
decreasing the value of the location recalculation interval responsive to the movement distance greater than a distance threshold and the value of the location recalculation interval greater than a second threshold value.

27. The method of claim 19, further comprising:
obtaining an estimated horizontal accuracy;
maintaining the value of the location recalculation interval responsive to the estimated horizontal accuracy greater than a horizontal accuracy threshold for less than a predetermined amount of time, and the value of the location recalculation interval less than the second threshold value;
maintaining the value of the location recalculation interval responsive to the estimated horizontal accuracy greater than the horizontal accuracy threshold for less than the predetermined amount of time, and the value of the location recalculation interval about equal to the second threshold value; and
increasing the value of the location recalculation interval responsive to the estimated horizontal accuracy greater than the horizontal accuracy threshold for greater than the predetermined amount of time, the predetermined number of failed location calculations, and the value of the location recalculation interval less than the first threshold value.

* * * * *

UNITED STATES PATENT AND TRADEMARK OFFICE
CERTIFICATE OF CORRECTION

| | | |
|---|---|---|
| PATENT NO. | : 8,036,679 B1 | |
| APPLICATION NO. | : 12/245072 | |
| DATED | : October 11, 2011 | |
| INVENTOR(S) | : Sean J. Barbeau et al. | |

It is certified that error appears in the above-identified patent and that said Letters Patent is hereby corrected as shown below:

Please change the word "Floirda" in the name of the assignee to "Florida".

Signed and Sealed this
Twentieth Day of December, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,036,679 B1 | Page 1 of 1 |
| APPLICATION NO. | : 12/245072 | |
| DATED | : October 11, 2011 | |
| INVENTOR(S) | : Sean J. Barbeau et al. | |

It is certified that error appears in the above-identified patent and that said Letters Patent is hereby corrected as shown below:

Title Page, Item (73) Assignee, please change the word "Floirda" to "Florida".

This certificate supersedes the Certificate of Correction issued December 20, 2011.

Signed and Sealed this
Tenth Day of January, 2012

David J. Kappos
*Director of the United States Patent and Trademark Office*